United States Patent
Munroe

(10) Patent No.: US 8,630,036 B2
(45) Date of Patent: Jan. 14, 2014

(54) METHOD AND SYSTEM USING PHASE MODULATION TO REDUCE SPECTRAL BROADENING

(75) Inventor: Michael J. Munroe, Eugene, OR (US)

(73) Assignee: Deep Photonics Corporation, Portland, OR (US)

( * ) Notice: Subject to any disclaimer, the term of this patent is extended or adjusted under 35 U.S.C. 154(b) by 264 days.

(21) Appl. No.: 12/916,131

(22) Filed: Oct. 29, 2010
(Under 37 CFR 1.47)

(65) Prior Publication Data

US 2012/0002688 A1    Jan. 5, 2012

Related U.S. Application Data

(60) Provisional application No. 61/256,763, filed on Oct. 30, 2009.

(51) Int. Cl.
*H04B 10/17* (2011.01)
*H01S 3/00* (2006.01)

(52) U.S. Cl.
USPC ........................................ 359/341.3; 359/337

(58) Field of Classification Search
USPC .................................. 359/337, 341.1; 372/25
See application file for complete search history.

(56) References Cited

U.S. PATENT DOCUMENTS

| | | | | |
|---|---|---|---|---|
| 5,168,164 A | * | 12/1992 | Urakami et al. | 250/458.1 |
| 6,188,511 B1 | * | 2/2001 | Marcenac et al. | 359/344 |
| 6,650,846 B1 | * | 11/2003 | Ito | 398/184 |
| 6,915,084 B2 | * | 7/2005 | Ho et al. | 398/208 |
| 7,103,285 B1 | * | 9/2006 | Okuno | 398/192 |
| 7,508,853 B2 | * | 3/2009 | Harter et al. | 372/30 |
| 2004/0012844 A1 | * | 1/2004 | Ohtsuki et al. | 359/341.1 |
| 2008/0130696 A1 | * | 6/2008 | Shahine | 372/38.02 |
| 2009/0107962 A1 | * | 4/2009 | Munroe et al. | 219/121.67 |
| 2009/0201573 A1 | * | 8/2009 | Xu et al. | 359/341.1 |

* cited by examiner

*Primary Examiner* — Eric Bolda
(74) *Attorney, Agent, or Firm* — Kilpatrick Townsend & Stockton LLP

(57) ABSTRACT

A laser system includes a seed laser operable to output a seed laser signal along an optical path and a phase modulator disposed along the optical path and operable to receive the seed laser signal. The laser system also includes a phase modulator driver coupled to the phase modulator. A drive signal from the phase modulator driver is operable to produce, as an output from the phase modulator, an unmodulated seed laser signal when the drive signal is associated with a first state and a modulated seed laser signal when the drive signal is associated with a second state. The laser system further includes a fiber amplifier disposed along the optical path and operable to receive the output of the phase modulator. A spectral bandwidth of an output of the fiber amplifier associated with the second state is less than a spectral bandwidth of the output of the fiber amplifier associated with the first state.

17 Claims, 8 Drawing Sheets ional Patent Application No. 61/256,763, filed on Oct. 30, 2009, entitled "Reduction of SPM-Induced Spectral Broadening in a High Peak Power, Narrow Linewidth, IR Fiber Laser Using Phase Modulation," the disclosure of which is hereby incorporated by reference in its entirety for all purposes.

METHOD AND SYSTEM USING PHASE MODULATION TO REDUCE SPECTRAL BROADENING

CROSS-REFERENCES TO RELATED APPLICATIONS

This application claims priority to U.S. Provisional Patent Application No. 61/256,763, filed on Oct. 30, 2009, entitled "Reduction of SPM-Induced Spectral Broadening in a High Peak Power, Narrow Linewidth, IR Fiber Laser Using Phase Modulation," the disclosure of which is hereby incorporated by reference in its entirety for all purposes.

BACKGROUND OF THE INVENTION

Fiber lasers have proven to be an effective source for LIDAR systems with their ability to generate high power pulse trains in the IR wavelength range that can be subsequently converted into frequency harmonics. Generally, systems that measure small shifts in reflected signals or narrow bandwidth absorption effects benefit from narrow spectral linewidth emission. Thus, there is a need in the art for improved methods and systems related to fiber lasers.

SUMMARY OF THE INVENTION

The present invention relates generally to optical systems. More specifically, the present invention relates to methods and systems for reducing spectral broadening induced by nonlinear optical effects using phase modulation. Merely by way of example, the invention has been applied to a method and system for pre-conditioning input pulses of a master oscillator seeded high peak power fiber amplifier to reduce self phase modulated (SPM) induced spectral broadening. The methods and techniques can be applied to a variety of laser, amplifier, and optically active systems.

According to an embodiment of the present invention, a laser system is provided. The laser system includes a seed laser operable to output a seed laser signal along an optical path and a phase modulator disposed along the optical path and operable to receive the seed laser signal. The laser system also includes a phase modulator driver coupled to the phase modulator. A drive signal from the phase modulator driver is operable to produce, as an output from the phase modulator, an unmodulated seed laser signal when the drive signal is associated with a first state and a modulated seed laser signal when the drive signal is associated with a second state. The laser system further includes a fiber amplifier disposed along the optical path and operable to receive the output of the phase modulator. A spectral bandwidth of an output of the fiber amplifier associated with the second state is less than a spectral bandwidth of the output of the fiber amplifier associated with the first state.

According to another embodiment of the present invention, a method of operating a laser system is provided. The method includes providing a seed signal having an initial power spectrum and applying a voltage to a phase modulator. The method also includes transmitting the seed signal through the phase modulator and modulating the seed signal to provide a modulated signal having a modulated power spectrum. The method further includes injecting the modulated signal into a fiber amplifier and amplifying the modulated signal to provide an output signal having an output power spectrum substantially equal to the initial power spectrum.

Numerous benefits are achieved by way of the present invention over conventional techniques. For example, embodiments of the present invention provide a method of reducing SPM in fiber amplifier systems. For example, embodiments of the present invention provide benefits of high power fiber laser operation while maintaining narrow spectral linewidth pulses. These and other embodiments of the invention along with many of its advantages and features are described in more detail in conjunction with the text below and attached figures.

DETAILED DESCRIPTION OF THE INVENTION

Figure 1:
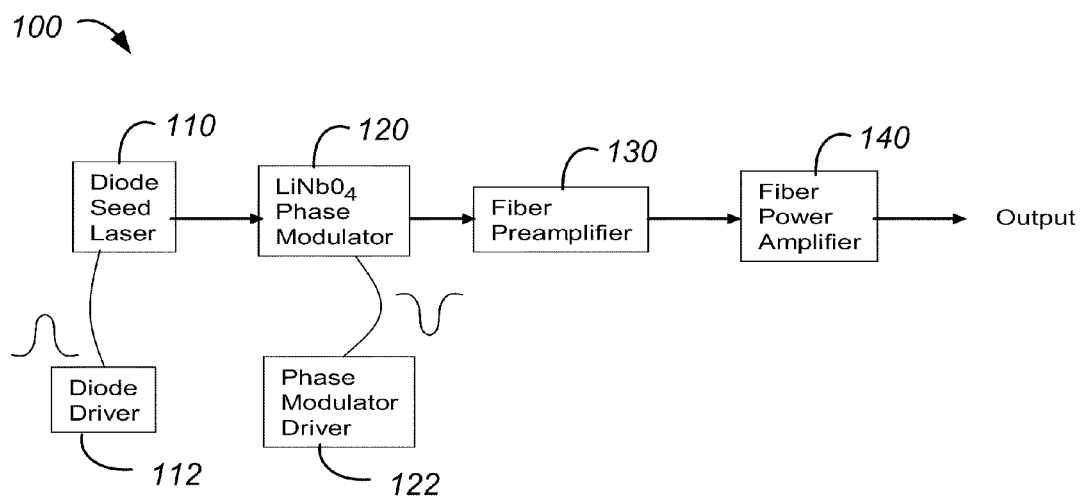
FIG. 1 is a simplified schematic diagram of a fiber laser system according to an embodiment of the present invention.

The inventors have determined that the spectral linewidth of lasers, for example, fiber lasers can be significantly broadened by self phase modulation (SPM) for pulse widths less than a few nanoseconds at high peak powers. Embodiments of the present invention relate to methods and systems for reducing the broadening effects of SPM by pre-conditioning the input pulses of a high power fiber amplifier with a phase modulator, for example, a fiber-coupled phase modulator. Without limiting embodiments of the present invention, the inventors believe that spectral broadening is decreased as a result of the phase modulator imparting the negative of the time-dependent phase shift induced by SPM on the input pulse. According to an embodiment of the present invention, a fiber laser system is utilized that includes a linear-polarized, 1064 nm, wavelength-stabilized master-oscillator-power-amplifier system emitting 1.5 ns pulses with 1 pm linewidth at a peak power of 25 kW, average power of 40 W, and repetition rate of 1 MHz. With no pre-conditioning for SPM, the output pulse gains a maximum phase shift of $5\pi$ across the pulse, resulting in a broadened spectrum with a linewidth of 20 pm. Utilizing the pre-conditioning of the seed pulse provided by embodiments of the present invention, the linewidth of the output emission can be reduced significantly, for example, to less than 2 pm.

Fiber amplifiers have been useful in applications in which the peak power of laser light is limited by nonlinear effects. Nonlinear impairments—intrinsic to the nature of propagating intense laser powers through optical fiber, such as stimulated Brillouin scattering (SBS), stimulated Raman scattering (SRS), and SPM—restrict the peak power that can be realized by fiber power amplifiers, particularly with pulsed master oscillator power amplifier (MOPA) laser architectures. These nonlinearities constrain laser pulse parameters such as pulse duration and pulse energy.

Based on the selection of pulse characteristics of the seed laser, one nonlinear impairment may dominate over another, and in the case of producing a powerful narrow frequency laser pulses from a fiber laser, SPM represents an obstacle. As peak powers are increased in a fiber amplifier, SPM is observed prior to SRS and SBS. With the avoidance of SRS and SBS through a deterministic selection of a pulse parameter window, embodiments of the present invention overcome the SPM nonlinear effect to achieve a narrow linewidth laser output.

According to embodiments of the present invention, method and systems are provided to reduce the spectral broadening effects of SPM in high-peak-power, narrow-band fiber lasers by preconditioning the input pulses of a master oscillator seeded high-peak-power fiber amplifier with a fiber-coupled phase modulator. As described more fully throughout the present specification, output emission linewidth reduction is demonstrated in a 1064 nm nanosecond pulse-width, 10 kW peak power fiber laser system. Data is presented for this system using a directly modulated diode seed laser in one embodiment and SPM mitigation is discussed.

Fiber lasers have proven to be an effective source for LIDAR systems as a result of their ability to generate high power pulse trains in the IR wavelength range as well as at harmonics. Narrow spectral linewidth emission is utilized in systems that measure small shifts in reflected signals or narrow bandwidth absorption effects. The spectral linewidth of these lasers can be significantly broadened by SPM for pulse widths less than a few nanoseconds at high peak powers. This SPM-induced spectral broadening has been observed in fiber communication systems and some system mitigate SPM by conditioning the received optical signal with a phase modulator after transmission through the fiber. However, the use of a phase modulator to condition the output of a high power fiber laser presents practical limitations due to high peak and average output powers.

Embodiments of the present invention provide methods and system to pre-condition the input pulses of a high power fiber amplifier using a fiber-coupled phase modulator in order to reduce or eliminate the broadening effects of SPM. Spectral broadening is decreased when the phase modulator imparts the negative of the time-dependent phase shift induced by SPM on the input pulse. In an embodiment, the fiber laser system includes a linear-polarized, 1064 nm, master-oscillator-power-amplifier (MOPA) that emits 1.5 ns pulses with 1 pm linewidth at a peak power of 10 kW, an average power of 12 W, and repetition rate of 0.8 MHz. With no pre-conditioning for SPM, the output pulse gains a maximum phase shift of $5\pi$ across the pulse, resulting in a broadened spectrum with a linewidth of 10 pm. Providing pre-conditioning of the seed pulse as described herein, the linewidth of the output emission is reduced in some embodiments to less than 2 pm. Since the peak and average output power of the master oscillator is relatively low, a fiber-coupled phase modulator is used as a component of the pre-conditioning system.

FIG. 1 is a simplified schematic diagram of a fiber laser system 100 according to an embodiment of the present invention. Referring to FIG. 1, a seed laser 110 can be wavelength-locked, 1064 nm, single spatial mode, single polarization diode laser that is directly driven by a suitable current pulse generator 112. As an example, an Avtech current pulse generator can be used to drive seed laser 110. The seed laser 110 emits a 0.8 MHz pulse train of 1.5 ns pulses with average power of 1 mW and a linewidth of less than 1 pm in an embodiment. Although a diode laser is used as the seed laser in some embodiments, other suitable lasers are included within the scope of the present invention including a fiber laser, a solid state laser, a diode pumped solid state laser, or the like.

The output of the seed laser is directed along an optical path and into a fiber-coupled phase modulator 120 (e.g., a LiNbO$_4$ fiber-coupled phase modulator) that is designed for operation at wavelengths matching the seed source 110. In the illustrated embodiment, the fiber-coupled phase modulator 120 is designed for operation at 1064 nm. The phase modulator 120 has a 3 dB bandwidth of 10 GHz, $V_\pi$=3V, 3 dB loss, and a ±30V drive range in an embodiment. The phase modulator 120 is driven by a phase modulator driver 122, for example, an Avtech voltage pulse generator. The seed laser current pulse generator 112 and the phase modulator voltage pulse generator 122 can be triggered using a common trigger with adjustable delay between the two in an embodiment. Alternatively, the phase modulator 120 and the seed laser 110 can be controlled by two independent driver units.

The system 100 also includes a polarization-maintaining preamplifier 130 that has 30 dB gain and amplifies the seed signal to 0.5 W average power in an embodiment. The power amplifier 140 is typically a fiber amplifier. As an example, the fiber amplifier can have 14 dB gain and include a length of gain fiber (e.g., 3.0 m of Liekki Yb1200-25/250-PM double clad gain fiber) and a length of delivery fiber (e.g., 2 m of 25 µm core diameter, polarization-maintaining delivery fiber). The power amplifier 140 outputs 12 W average power.

Figure 2:
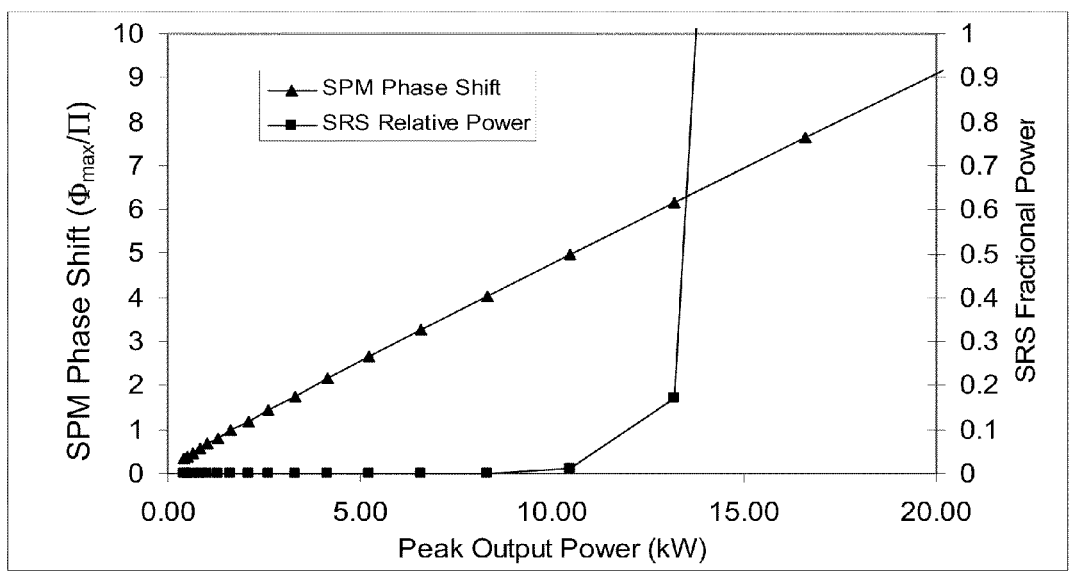
FIG. 2 is a simplified plot of SPM-induced phase shift and fractional SRS power as a function of peak output power according to an embodiment of the present invention.

FIG. 2 is a simplified plot of SPM-induced phase shift and fractional SRS power as a function of peak output power according to an embodiment of the present invention. The SRS fractional power is the SRS power divided by the total power and can also be referred to as the SRS relative power. The plots illustrated in FIG. 2 are associated with the phase modulator 120 being in an inactive state. The data illustrated in FIG. 2 can be computed using modeling to characterize nonlinearities in the fiber amplifier to determine the power level at which the onset of SRS occurs. The modeling data can be confirmed experimentally by increasing the peak power input into the fiber amplifier or the gain of the fiber amplifier and examining the output of the fiber amplifier to determine the onset of a power peak at a Raman shifted wavelength. Methods associated with characterization of fiber amplifiers in relation to nonlinear effects are included within the scope of the present invention.

At 10 kW peak power output, the fractional SRS power is approximately 1% while the SPM-induced phase shift across the pulse is approximately $5\pi$. As the peak power increases beyond 10 kW, the SRS threshold is reached. It should be noted that saturation effects are not included in the data illustrated in FIG. 2 as is evident by the rapid rise of the SRS fractional power to unity once threshold is reached. Embodiments of the present invention enable for compensation of the SPM phase shift by isolation of the SPM through use of pre-conditioning of the seed laser signal using a phase modulator.

Figure 3A:
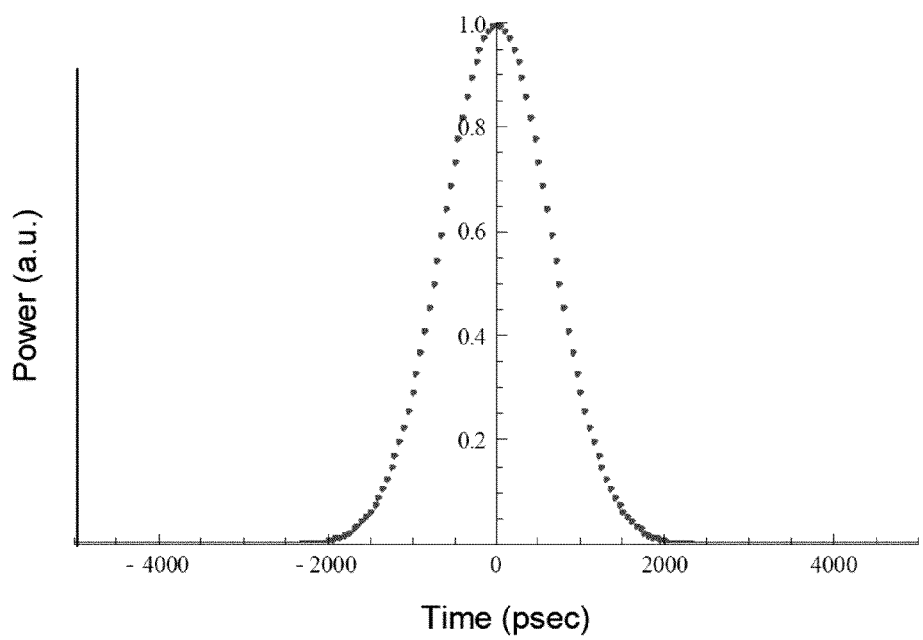
FIG. 3A is a simplified plot of seed emission power as a function of time according to an embodiment of the present invention.
Figure 3B:
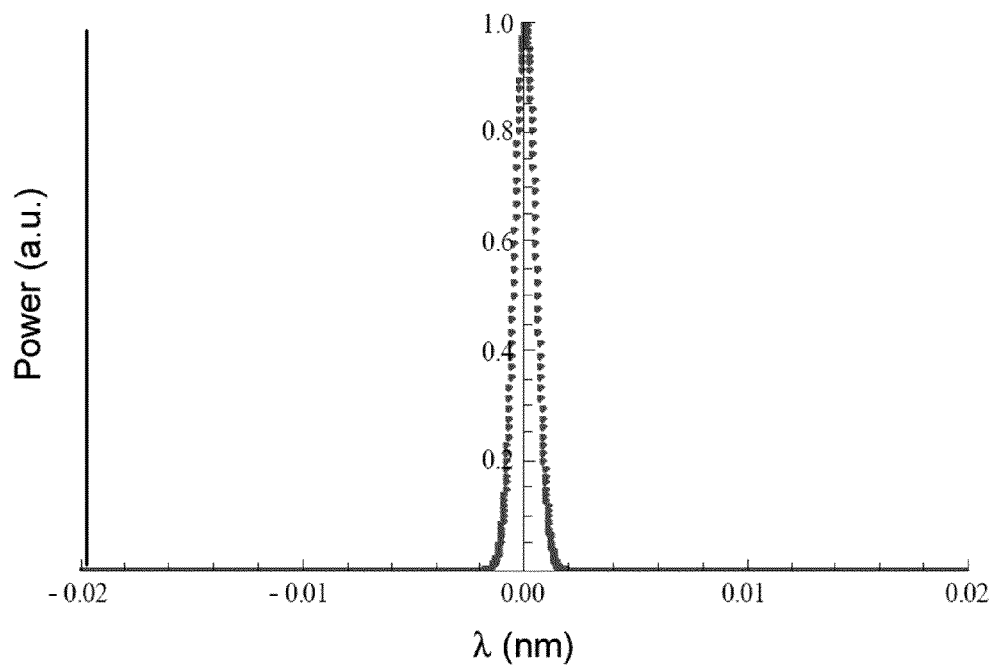
FIG. 3B is a simplified plot of the power spectrum of the seed laser according to an embodiment of the present invention.

FIG. 3A is a simplified plot of seed emission power as a function of time according to an embodiment of the present invention. FIG. 3B is a simplified plot of the power spectrum of the seed laser according to an embodiment of the present invention. The seed pulse illustrated in FIG. 1 can be compared to a Gaussian pulse with a FWHM of 1.5 ns. The resulting transform-limited spectral width as illustrated in FIG. 3B is 1.1 pm.

The pulse entering the power amplifier 140 in some embodiments has negligible SPM-induced spectral broadening. The effects of SPM in the power amplifier 140 can be determined by computing the evolution of the pulse as it is amplified in the power amplifier and then computing the accumulated phase excursion due to SPM. SPM in the power amplifier induces a temporally dependent phase shift on the pulse as it is amplified that is proportional to the instantaneous intensity. At the output, the electric field of the amplifier (E(t,z) at length L) i.e.:

$$E(t, L) = E(t, 0)\sqrt{G} \exp\left(\Phi_{max} \frac{I(t, 0)}{I(t_{max}, 0)}\right), \quad (1)$$

where G is the single pass gain of the power amplifier, $I(t,z)=\sqrt{|E(t,z)|^2}$ is the intensity, and $t_{max}$ is the time of peak pulse intensity in the moving reference frame of the pulse. The maximum phase excursion in the output pulse is given by:

$$\Phi_{max} = k_o n_2 \int_0^L I(t_{max}, z) dz, \quad (2)$$

where $k_o$ is the wavenumber in vacuum and $n_2=2.3\times10^{-13}$ cm$^2$/W is the nonlinear index of refraction. The optical spectrum of the power amplifier emission can be computed by taking the Fourier transform of Eqn. 1 using a $\Phi_{max}=5\pi$.

Figure 4:
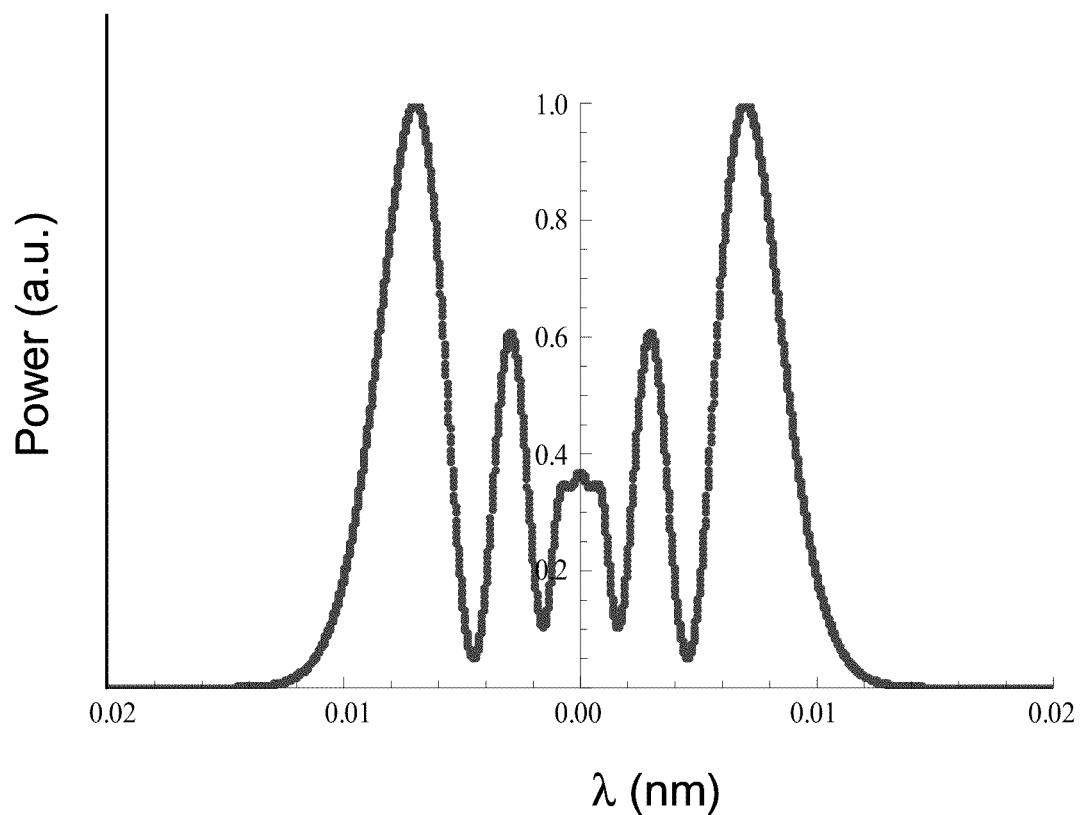
FIG. 4 is a simplified plot of the output power spectrum of the power amplifier with the phase modulator inactive according to an embodiment of the present invention.

FIG. 4 is a simplified plot of the output power spectrum of the power amplifier with the phase modulator inactive according to an embodiment of the present invention. The spectral width is broadened out to approximately 20 pm and the spectrum shows the characteristic multiple peaks caused by SPM.

Figure 5A:
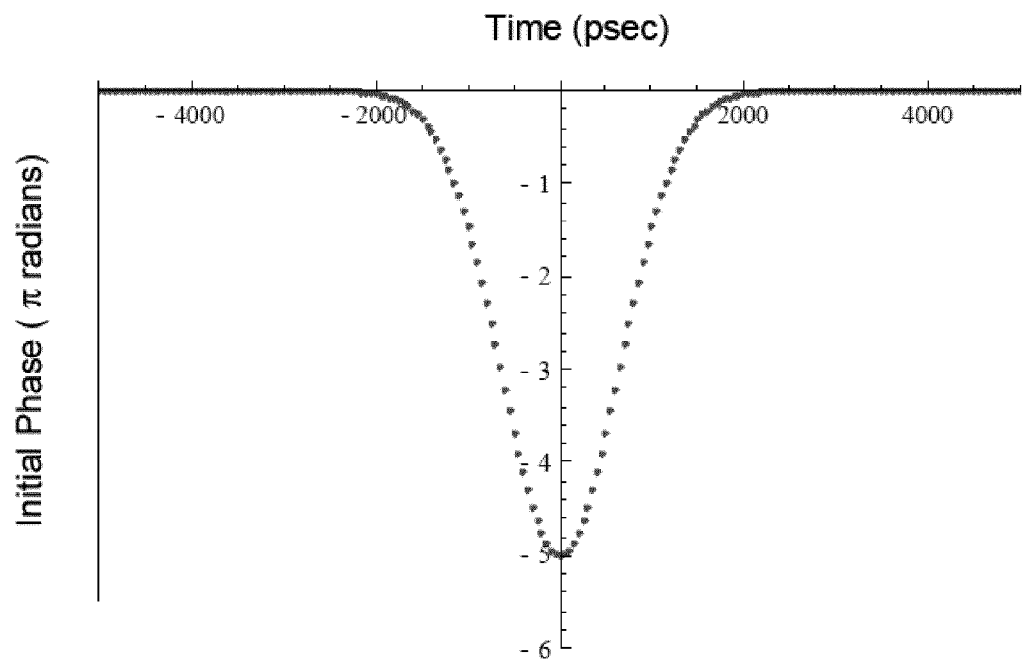
FIG. 5A is a simplified plot of phase shift as a function of time according to an embodiment of the present invention.
Figure 5B:
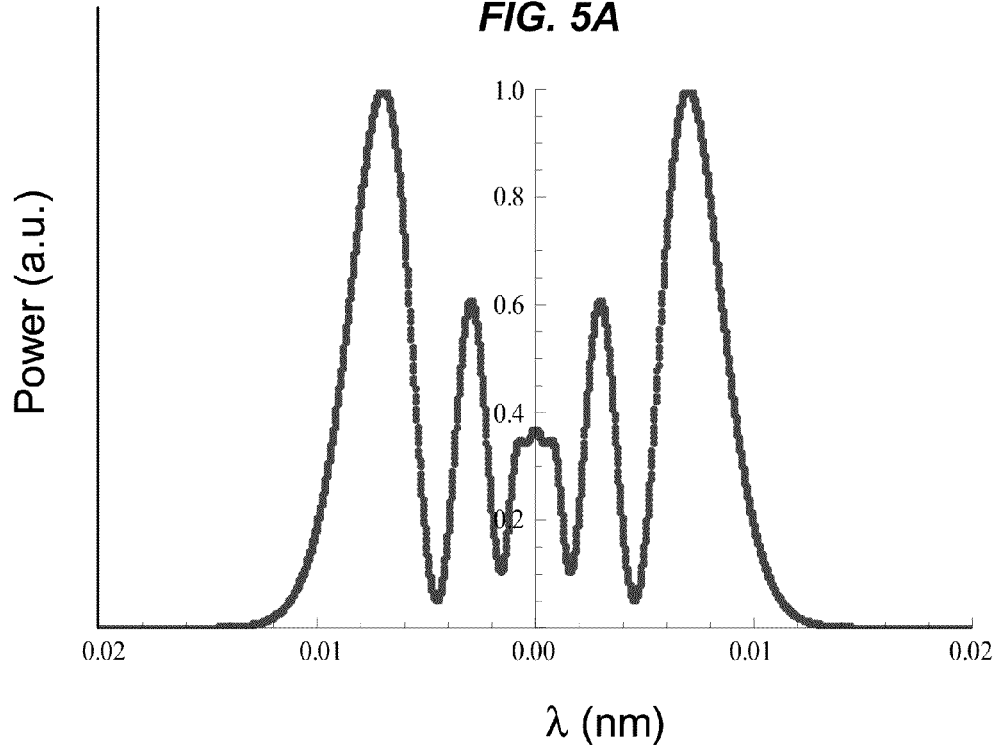
FIG. 5B is a simplified plot of an input power spectrum after the phase modulation according to an embodiment of the present invention.

In order to reduce the SPM-induced broadening, embodiments of the present invention pre-condition the seed pulse by imparting a temporally dependent phase on the pulse with the phase modulator. Since the SPM-induced phase shift will be additive to any phase shift on the seed pulse, the phase modulator imparts the negative of the SPM-induced phase shift in some embodiments FIG. 5A is a simplified plot of phase shift as a function of time according to an embodiment of the present invention. FIG. 5B is a simplified plot of an input power spectrum after the phase modulation according to an embodiment of the present invention. FIG. 5A illustrates the ideal phase shift to compensate for the SPM-induced by the power amplifier with a maximum phase excursion of $-5\pi$. FIG. 5B illustrates the resulting input power spectrum after the phase modulation. The drive voltage on the phase modulator is 15 V to impart the $-5\pi$ phase on the pulse in an embodiment. The input spectrum is broadened by the phase modulator.

After propagation through the power amplifier 140, the SPM-induced phase shift negates the temporally dependent phase shift imparted by the phase modulator. The bandwidth of the resulting output spectrum is identical to or approximate equal to (e.g., less than twice) the bandwidth of the initial spectrum of the seed laser in some embodiments.

Figure 6:
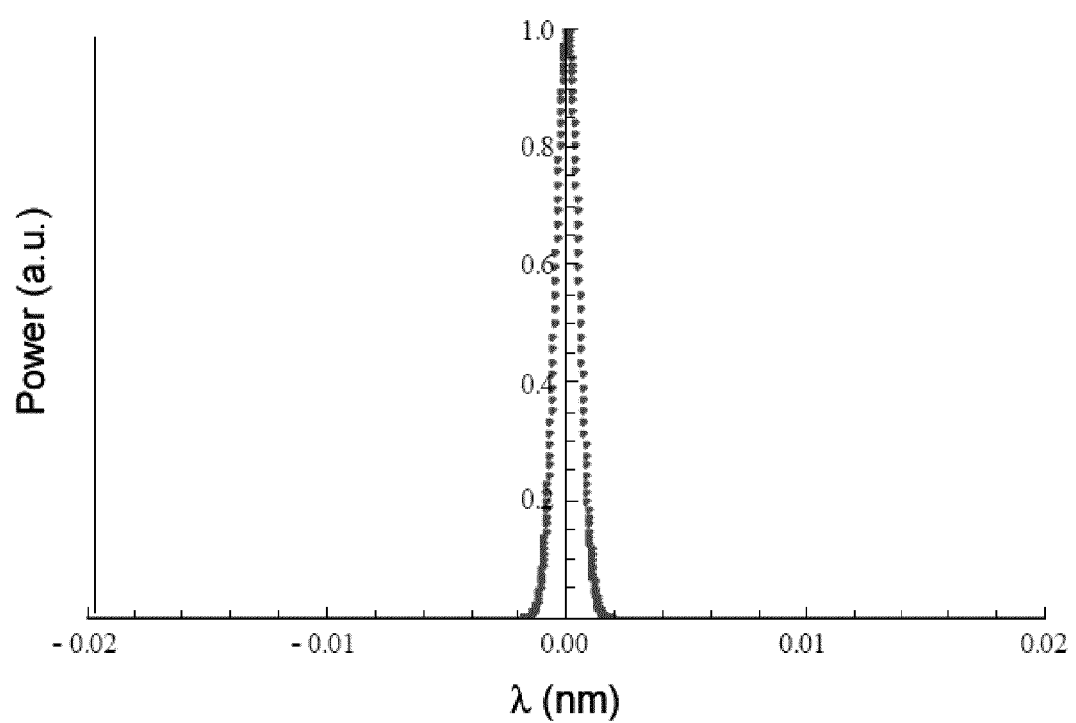
FIG. 6 is a simplified plot of the output power spectrum of the seed laser according to an embodiment of the present invention.

FIG. 6 is a simplified plot of the output power spectrum of the seed laser according to an embodiment of the present invention. The output linewidth is equivalent to the seed laser linewidth of 1.1 pm.

Figure 7A:
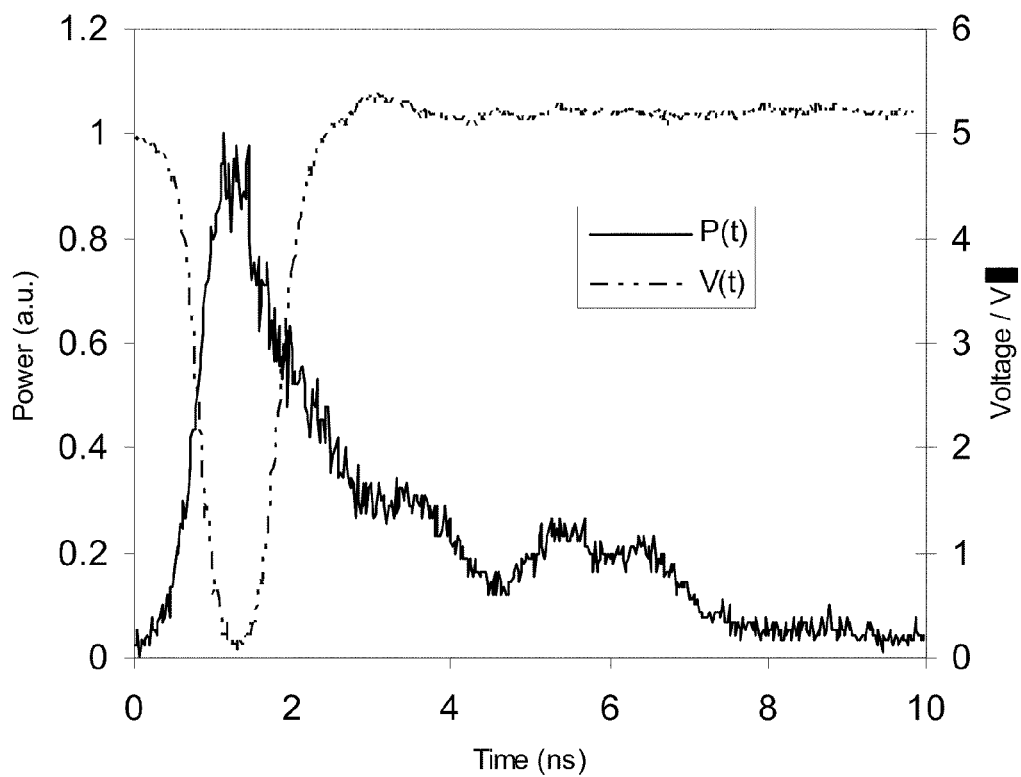
FIG. 7A is a simplified plot of the output power and the modulator drive voltage as a function of time according to an embodiment of the present invention.

Referring once again to FIG. 2, in an embodiment, the fiber laser system 100 was operated at 12 W average power and a 0.8 MHz repetition rate. FIG. 7A is a simplified plot of the output power and the modulator drive voltage as a function of time. As an example, the temporal measurements of the laser can be made using a 2.5 GHz bandwidth InGaAs detector and a 500 MHz bandwidth digitizing oscilloscope.

Figure 7B:
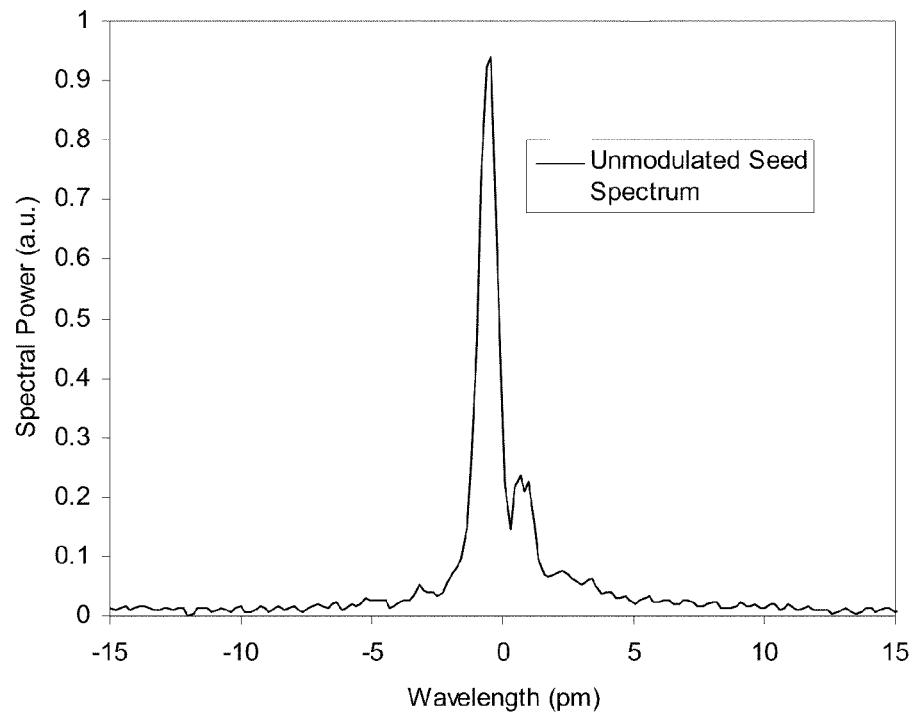
FIG. 7B is a simplified plot of the output power spectrum of the seed laser with the modulator inactive according to an embodiment of the present invention.

FIG. 7B is a simplified plot of the output power spectrum of the seed laser with the modulator inactive according to an embodiment of the present invention. As an example, the optical spectrum of the fiber laser output can be measured using a 7.5 GHz free-spectral-range Fabry-Perot spectrometer with a finesse of 200.

Referring to FIG. 7A, the output power pulse (P(t)) has a temporal width (FWHM) of approximately 1.5 ns and has a much shorter rise time than fall time. The optical power spectrum of the seed laser is illustrated in FIG. 7B and has a FWHM linewidth of less than 1 pm. The voltage pulse (V(t)) driving the phase modulator is adjusted in some embodiments to minimize the measured output optical spectrum of the fiber laser. The delay between the seed laser drive pulse and the phase modulator drive pulse, the phase modulator drive pulse peak voltage, and the phase modulator drive pulse temporal width can each be adjusted according to embodiments of the present invention. The resulting phase modulator drive voltage versus time (V(t)) is shown in FIG. 7A. The voltage is in units of the half-wave voltage of the modulator $V_\pi$. The drive pulse initial fall time matches the rise time of the output optical pulse and the temporal widths of the phase modulator drive pulse is approximately equal to that of the optical output pulse. In some embodiments, the match between the pulses is less than optimal during the rise of the phase modulator drive pulse (the falling edge of the optical output pulse). In order to improve this condition, the phase modulator pulse generator can be provided with independently adjustable rise time and fall time. One of ordinary skill in the art would recognize many variations, modifications, and alternatives.

Figure 8:
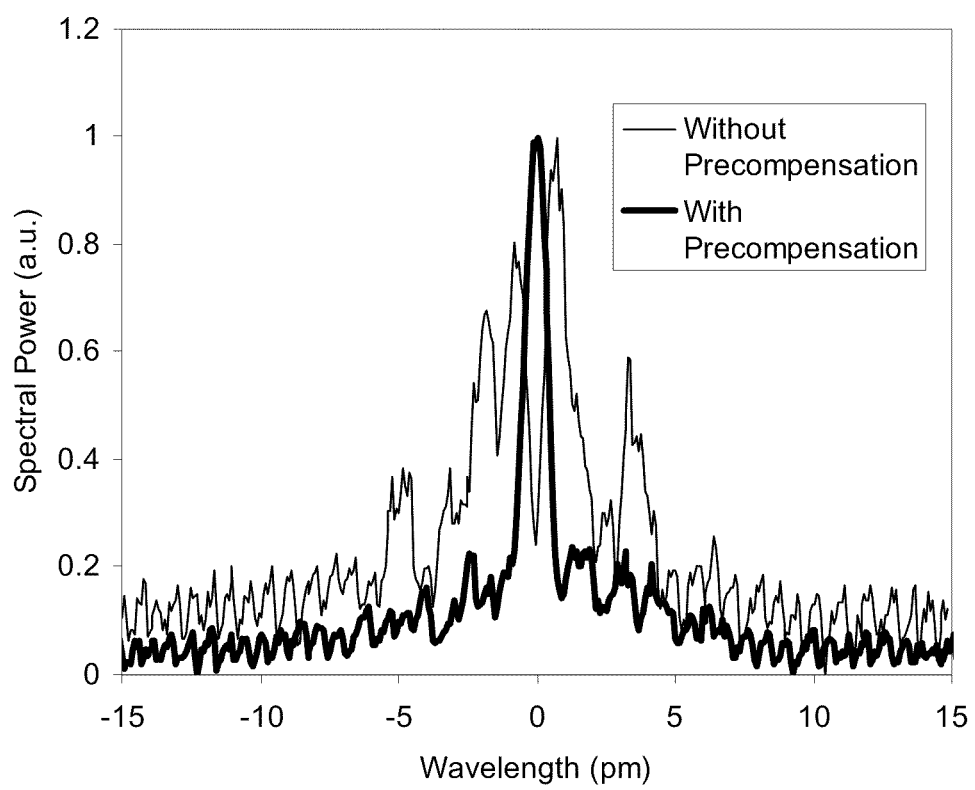
FIG. 8 is a simplified plot of the output power spectrum of the fiber laser with pre-compensation (phase modulator active) and without pre-compensation (phase modulator inactive) according to an embodiment of the present invention.

FIG. 8 is a simplified plot of the output power spectrum of the fiber laser with pre-compensation (phase modulator active) and without pre-compensation (phase modulator inactive) according to an embodiment of the present invention. Without phase pre-compensation, the optical spectrum of the output pulse broadens to approximately 10 pm width as shown in FIG. 8. With pre-conditioning, the output optical spectrum narrows to a FWHM value of 1.2 pm and has one dominate peak when the phase modulator is active.

While the output power spectrum without pre-conditioning illustrated in FIG. 8 has a complicated structure that is a signature of SPM-induced broadening, its width is narrower than expected and its structure is not symmetric. Without limiting embodiments of the present invention, the differences from expectations can be attributed to the non-Gaussian nature of the seed laser pulse shape and to an initial phase structure present on the pulse.

Embodiments of the present invention provide for reductions in SPM-induced spectral broadening by phase pre-compensation of the seed pulses in a MOPA-based fiber laser using a phase modulator. Embodiments of the present invention reduce the spectral broadening by up to and more than an order of magnitude.

The phase modulator drive pulse can be made to closely match the fiber laser output pulse in pulse shape through a variety of techniques. As an example, a nanosecond pulse generator with independently adjustable rise time and fall time can be used to provide a better match between the two pulse shapes than achieved using other pulse generators. Furthermore, filtering of the voltage pulse with custom filters can be used to provide more control over the phase modulator drive pulse shape. According to an alternative embodiment, seed pulses that match the drive pulse are provided in place of the shaping of the phase modulator drive pulse as described herein. As an example, such a system could utilize an electro-optic modulator to create the seed pulse instead of directly modulating a diode laser. Thus, embodiments of the present invention provide additional reductions in SPM-induced broadening.

Figure 9:
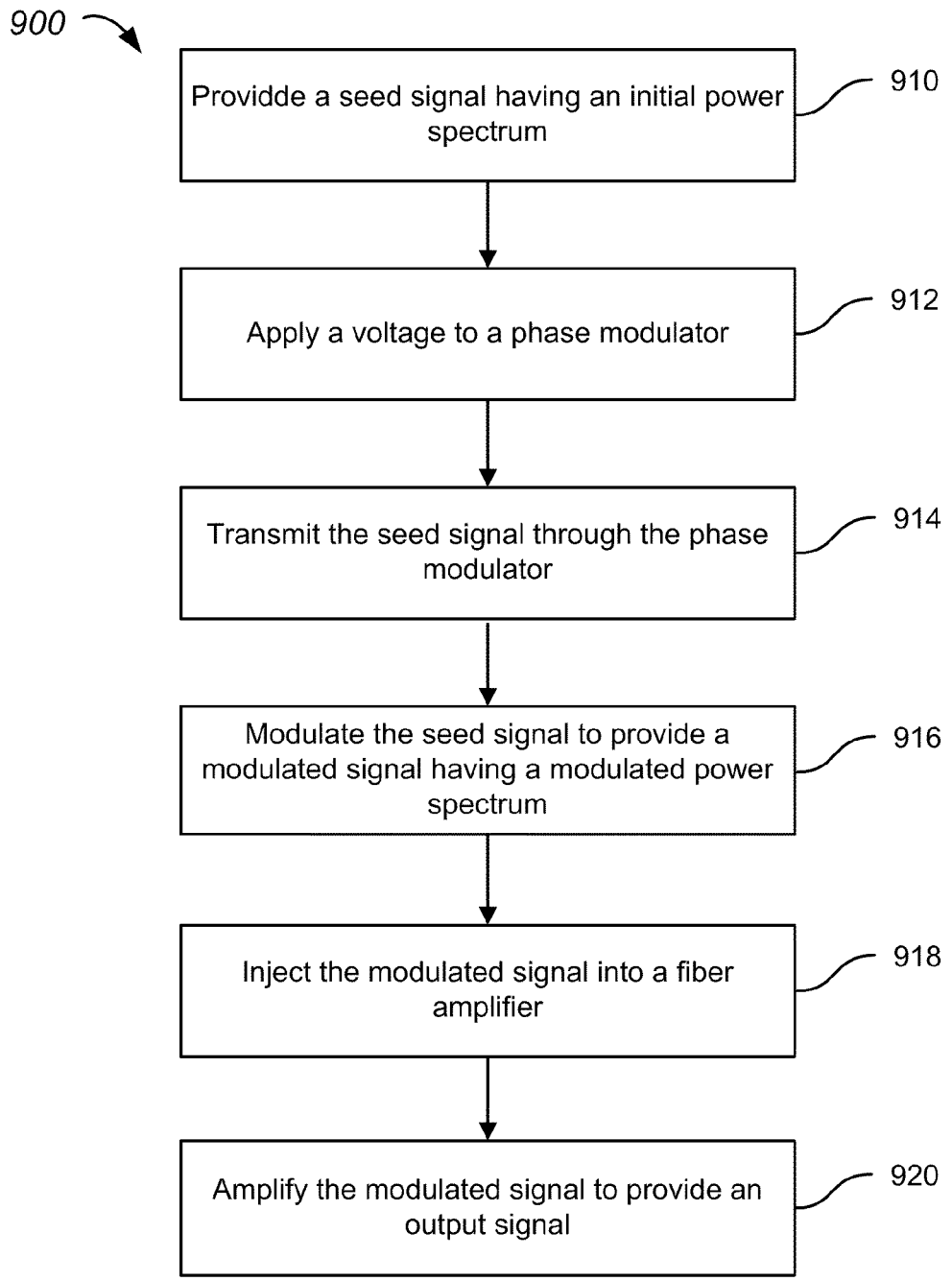
FIG. 9 is a simplified flowchart illustrating a method of operating a laser system according to an embodiment of the present invention.

FIG. 9 is a simplified flowchart illustrating a method of operating a laser system according to an embodiment of the present invention. The method 900 includes providing a seed signal having an initial power spectrum (910) and applying a voltage (e.g., a time varying voltage) to a phase modulator (912). The method also includes transmitting the seed signal through the phase modulator (914) and modulating the seed signal to provide a modulated signal having a modulated power spectrum (916). As illustrated in FIGS. 5B and 3B, a spectral bandwidth associated with the modulated power spectrum is greater than a spectral bandwidth associated with the initial power spectrum.

The method further includes injecting the modulated signal into a fiber amplifier (918) and amplifying the modulated signal to provide an output signal having an output power spectrum substantially equal to the initial power spectrum (920).

According to an embodiment of the present invention, the method can also include pulse modulating the seed signal to provide a series of laser pulses to the phase modulator. Thus, embodiments of the present invention include both pulsed and CW operation.

The seed laser can be characterized by an initial temporal power profile comprising a function having a rising edge, a peak at a first time after the rising edge, and a trailing edge after the peak. As illustrated in FIG. 7A, the trailing edge of the initial temporal power profile can be is characterized by a fall time greater than a rise time associated with the rising edge.

The seed laser wavelength can be characterized by a seed wavelength and, as illustrated in FIG. 5B, the modulated power spectrum can include a plurality of peaks including peaks associated with larger wavelength variations from the seed wavelength having a larger amplitude than peaks associated with smaller wavelength variations from the seed wavelength.

According to an embodiment, the method can include characterizing the fiber amplifier prior to transmitting the seed signal through the phase modulator, for example, by determining a level of SPM broadening associated with the fiber amplifier. Utilizing embodiments of the present invention, the output power spectrum is characterized by a spectral bandwidth less than twice a bandwidth associated with the initial power spectrum.

It should be appreciated that the specific steps illustrated in FIG. 9 provide a particular method of operating a laser system according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention reduce the spectral bandwidth of a MOPA-based fiber laser with SPM impairments imposed on the amplified signal. According to an embodiment, the method includes measuring the phase signature of the seeding laser. The methods also include modeling the operation of the fiber amplifier to deterministically avoid SRS nonlinear impairments. Alternatively, the amplification characteristics of the fiber amplifier can be measured to verify the absence of significant SRS nonlinear impairments. Additionally, the methods can include measuring the phase signature of the fiber amplifier to characterize the SPM nonlinearities. Furthermore, the method includes imposing a phase modulation signature using a phase modulator between the seed source and the fiber amplifier. The phase modulation signature anti-correlates with the SPM phase distortion of the characterized fiber amplifier. Using these methods, one will observe the power spectrum of the MOPA fiber laser output greatly reduced from the spectral bandwidth observed without pre-amplification phase conditioning.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A laser system comprising:
a seed laser operable to output a seed laser signal along an optical path;
a phase modulator disposed along the optical path and operable to receive the seed laser signal;
a phase modulator driver coupled to the phase modulator, wherein a drive signal from the phase modulator driver is operable to produce, as an output from the phase modulator, an unmodulated seed laser signal when the drive signal is associated with a first state and a modulated seed laser signal when the drive signal is associated with a second state;
a fiber amplifier disposed along the optical path and operable to receive the output of the phase modulator, wherein a spectral bandwidth of an output of the fiber amplifier associated with the second state is less than a spectral bandwidth of the output of the fiber amplifier associated with the first state.

2. The laser system of claim 1 wherein the seed laser comprises a semiconductor laser.

3. The laser system of claim 1 wherein the phase modulator comprises a LiNbO3 phase modulator.

4. The laser system of claim 1 wherein the modulated seed laser signal comprises a signal including temporal phase modulation.

5. The laser system of claim 4 wherein the temporal phase modulation comprises a Gaussian waveform.

6. The laser system of claim 1 further comprising a seed laser driver.

7. The laser system of claim 6 wherein the phase modulator driver and the seed laser driver comprise a single driver.

8. The laser system of claim 1 wherein a power spectrum of the output of the fiber amplifier associated with the first state is characterized by a plurality of peaks.

9. A method of operating a laser system, the method comprising:
providing a seed signal having an initial power spectrum;
applying a voltage to a phase modulator;
transmitting the seed signal through the phase modulator;
modulating the seed signal to provide a modulated signal having a modulated power spectrum;
injecting the modulated signal into a fiber amplifier; and
amplifying the modulated signal to provide an output signal having an output power spectrum substantially equal to the initial power spectrum.

10. The method of claim 9 further comprising pulse modulating the seed signal to provide a series of laser pulses to the phase modulator.

11. The method of claim 9 wherein the seed laser is characterized by an initial temporal power profile comprising a function having a rising edge, a peak at a first time after the rising edge, and a trailing edge after the peak.

12. The method of claim 11 wherein the trailing edge is characterized by a fall time greater than a rise time associated with the rising edge.

13. The method of claim 9 wherein the seed signal is characterized by a seed wavelength and wherein the modulated power spectrum comprises a plurality of peaks including peaks associated with larger wavelength variations from the seed wavelength having a larger amplitude than peaks associated with smaller wavelength variations from the seed wavelength.

14. The method of claim 9 further comprising determining a level of SPM broadening associated with the fiber amplifier prior to transmitting the seed signal through the phase modulator.

15. The method of claim 9 wherein a spectral bandwidth associated with the modulated power spectrum is greater than a spectral bandwidth associated with the initial power spectrum.

16. The method of claim 9 wherein the output power spectrum is characterized by a spectral bandwidth less than twice a bandwidth associated with the initial power spectrum.

17. The method of claim 9 wherein the voltage applied to the phase modulator comprises a time varying voltage.

* * * * *